May 30, 1933.  A. H. LONG  1,911,321
SHEET STRAIGHTENING MACHINE
Filed Jan. 9, 1931  9 Sheets-Sheet 1

May 30, 1933.    A. H. LONG    1,911,321
SHEET STRAIGHTENING MACHINE
Filed Jan. 9, 1931    9 Sheets-Sheet 2

Inventor:—
A. H. Long.
by his Attorney
Howson & Howson

May 30, 1933.  A. H. LONG  1,911,321
SHEET STRAIGHTENING MACHINE
Filed Jan. 9, 1931    9 Sheets-Sheet 3

Inventor:—
A. H. Long.
by his Attorneys
Howson & Howson

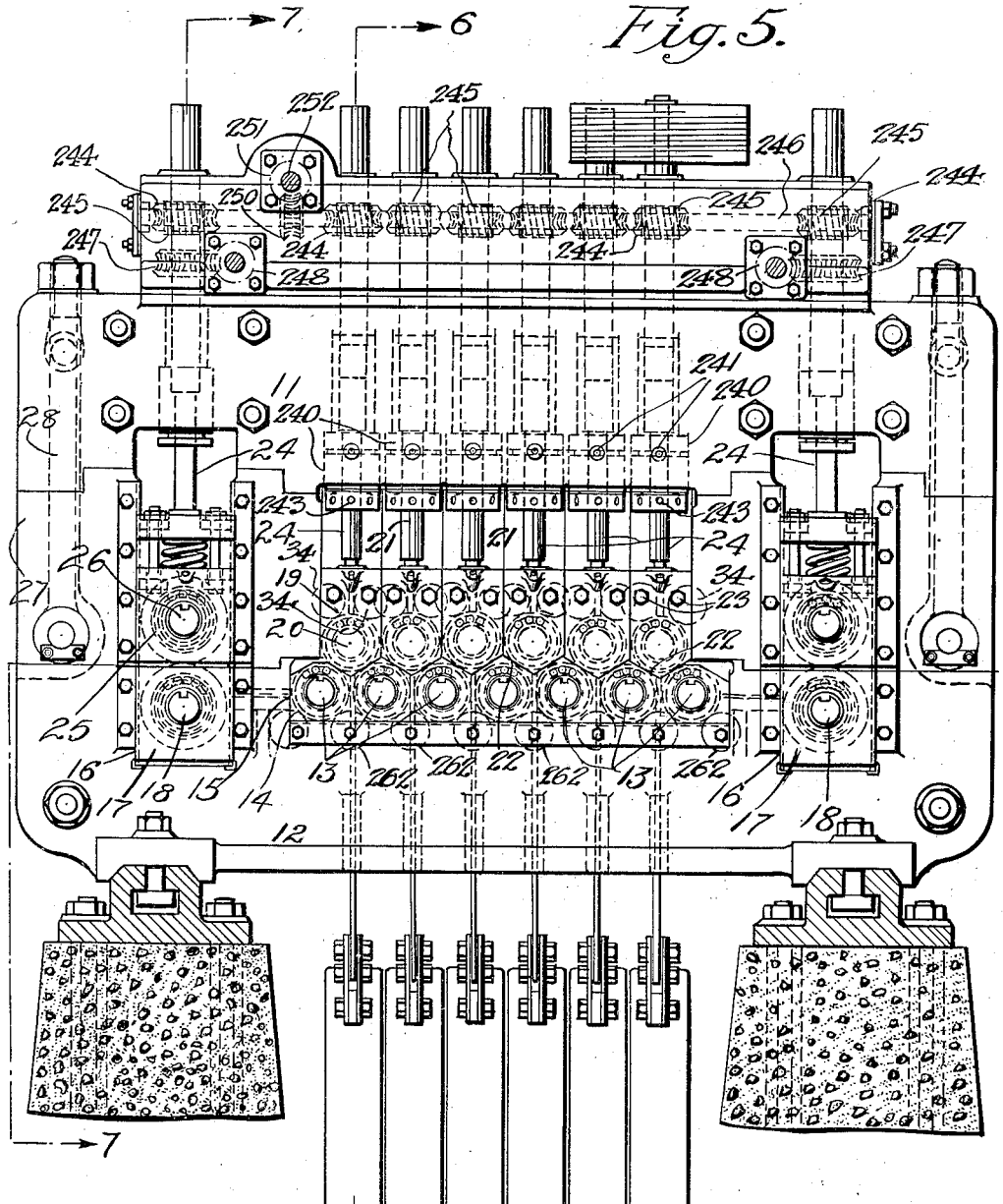

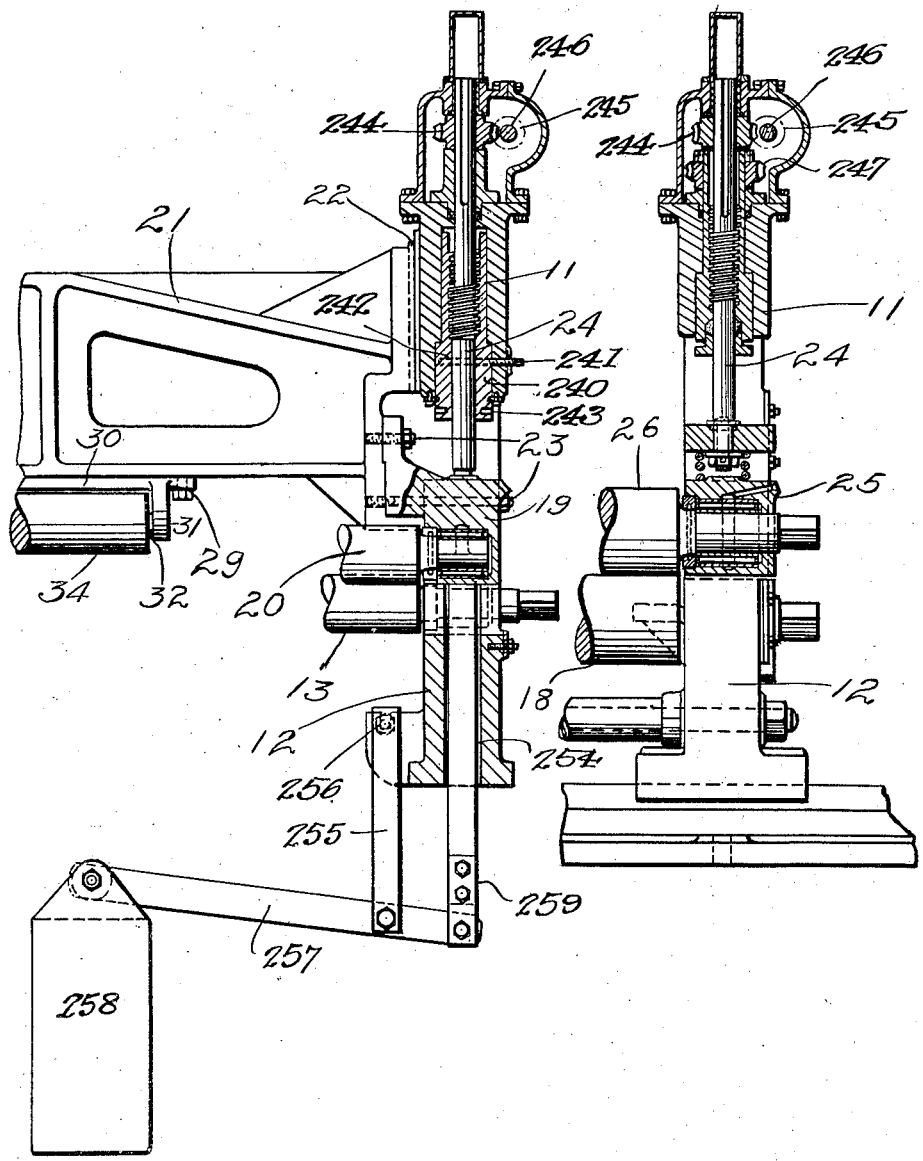

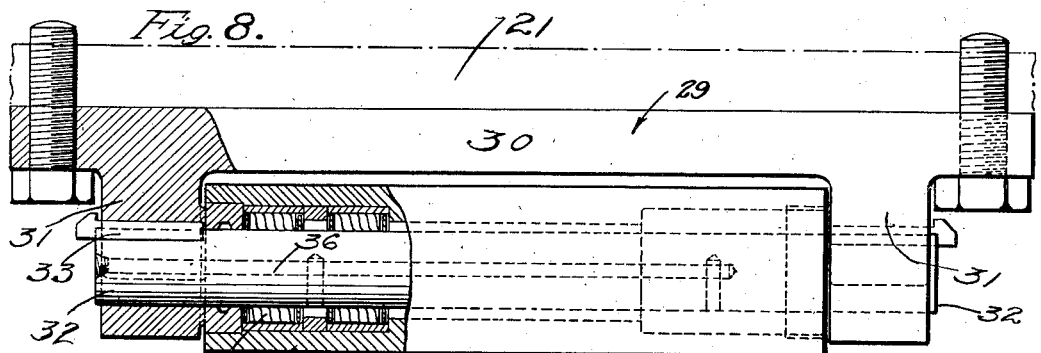
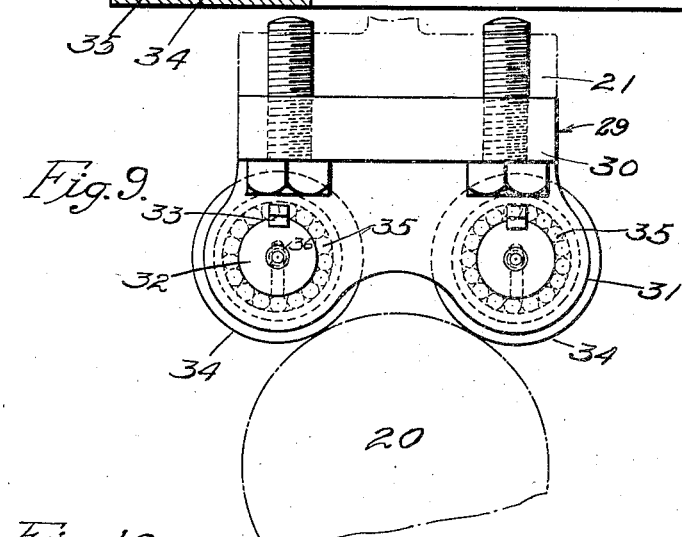
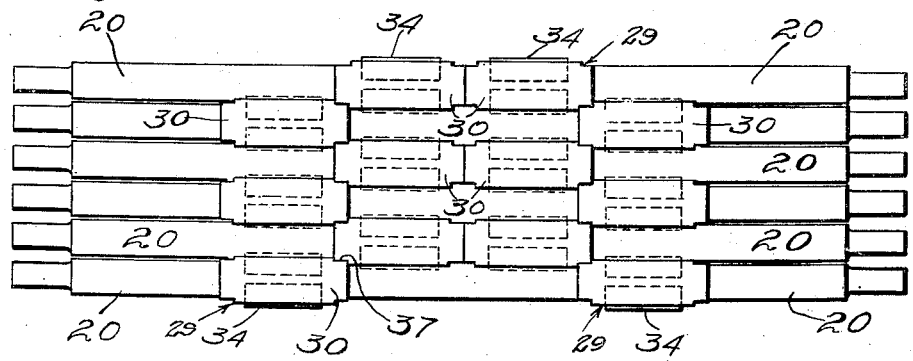

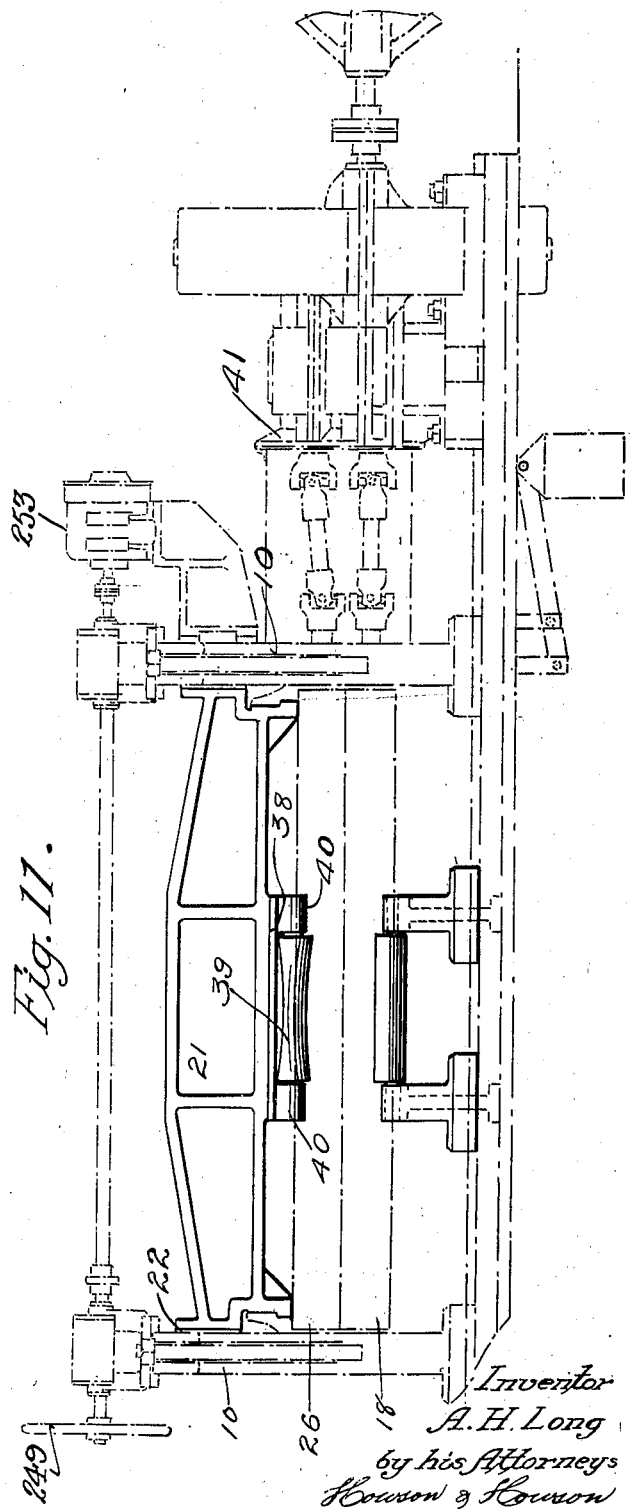
Fig. 12
Fig. 11

May 30, 1933.  A. H. LONG  1,911,321
SHEET STRAIGHTENING MACHINE
Filed Jan. 9, 1931  9 Sheets-Sheet 8

Inventor:—
A. H. Long
by his Attorneys
Howson & Howson

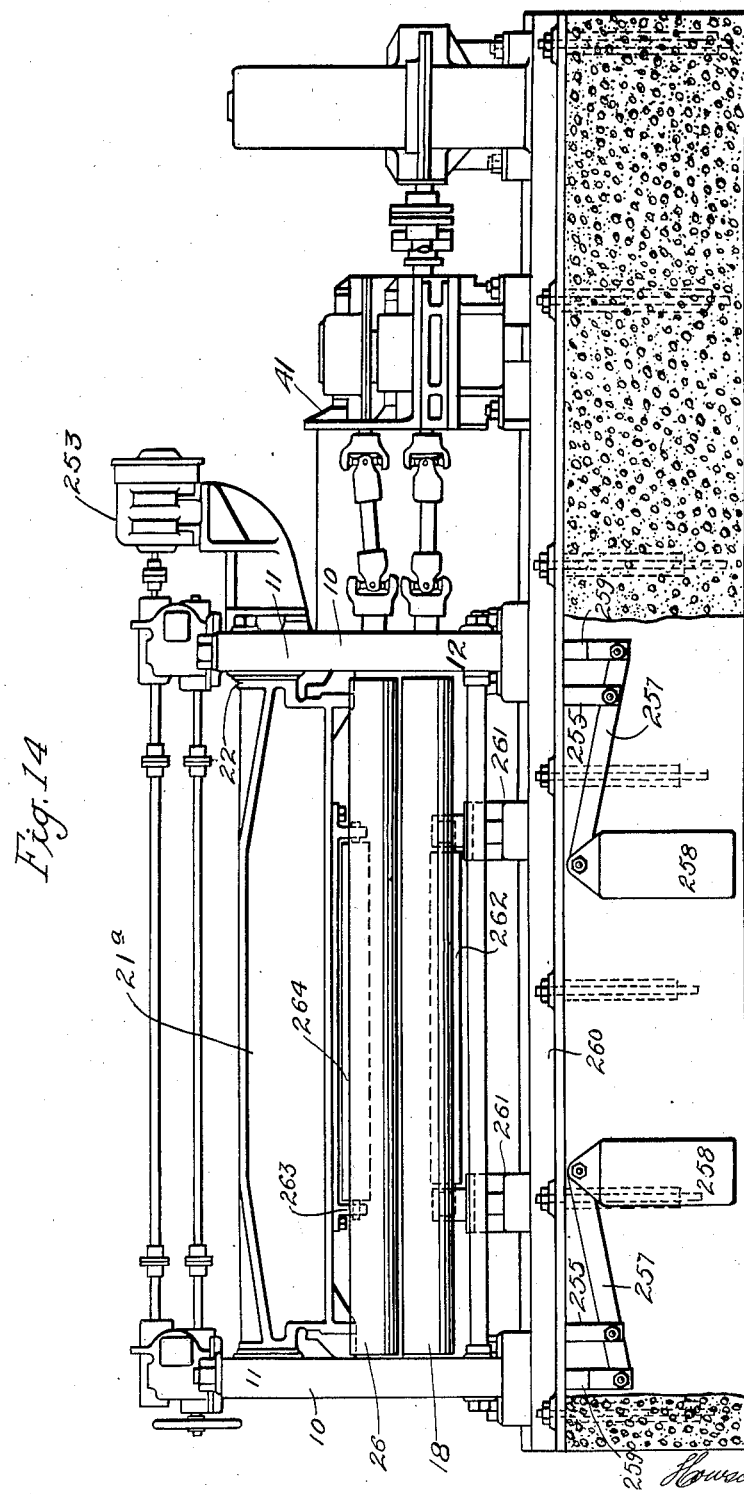

Patented May 30, 1933

1,911,321

UNITED STATES PATENT OFFICE

ARTHUR H. LONG, OF NORRISTOWN, PENNSYLVANIA, ASSIGNOR TO R. S. NEWBOLD & SON COMPANY, INCORPORATED, OF NORRISTOWN, PENNSYLVANIA, A CORPORATION OF PENNSYLVANIA

SHEET STRAIGHTENING MACHINE

Application filed January 9, 1931. Serial No. 507,766.

This invention relates to sheet-straightening machines, and more particularly to a machine for straightening light sheets such as employed in the construction of automobile bodies and the like.

An important object of the invention is to provide in a construction of this character an arrangement such that the parallel straightening rolls which operate on the sheet may be provided with backing rolls without unduly spacing the rolls.

In a straightening machine of this character the rolls employed are very small in diameter and accordingly have a tendency to flex longitudinally. For most efficient operation of the straightening machine these rolls must be placed in close proximity to one another and when so placed afford little room for a backing means which will prevent roll flexure. It would, of course, be possible to place a single backing roll above the axis of each straightening roll, but such a backing would prove insufficient as it would not prevent transverse flexure. It is necessary to adequate backing that the backing means engage the straightening roll at opposite sides of a vertical plane including the axis of a roll. Accordingly, an important object of the present invention is the provision of backing roll means which will provide engagement with the straightening roll at opposite sides of such a plane and which at the same time may be so arranged that the backing rolls will not interfere with placement of the straightening rolls in close proximity to one another.

A further object of the invention is the provision of a construction in a straightening machine permitting individual rolls with their backing rolls to be independently removed for repairs or replacement, and in which each individual roll is provided with its own rigid mounting mechanism from which the backing mechanism is supported.

A still further object of the invention is the provision of a structure such that the machine may be very readily assembled and disassembled for repairs thereto.

A further object of the invention is an improvement of the structure shown in my prior application for patent on Sheet straightening machine, Serial No. 409,020, filed November 22, 1929, of which application this application is in part a continuation.

These and other objects I attain by the construction shown in the accompanying drawings wherein, for the purpose of illustration, I have shown a preferred embodiment of my invention, and wherein:

Figure 1 is a side elevation showing the rollers and driving mechanism;

Fig. 5 is an enlarged end view showing roller journals and mountings;

Fig. 6 is a sectional view taken on line 6—6, Fig. 5;

Fig. 7 is a sectional view taken on line 7—7, Fig. 5;

Fig. 8 is an enlarged detailed view of the backing up rollers;

Fig. 9 is an end view of Fig. 8 showing the position of backing up rollers on straightening rollers;

Fig. 10 is a diagrammatic view showing the arrangement of backing up rollers on the straightening rollers;

Fig. 11 is a side elevation showing an alternate form of my invention with the machine in dotted lines;

Fig. 12 is an enlarged diagrammatic view of the backing up roller illustrating the alternate form shown in Fig. 11;

Fig. 14 is a side elevation of the sheet straightening machine shown in Fig. 13.

Figure 2:
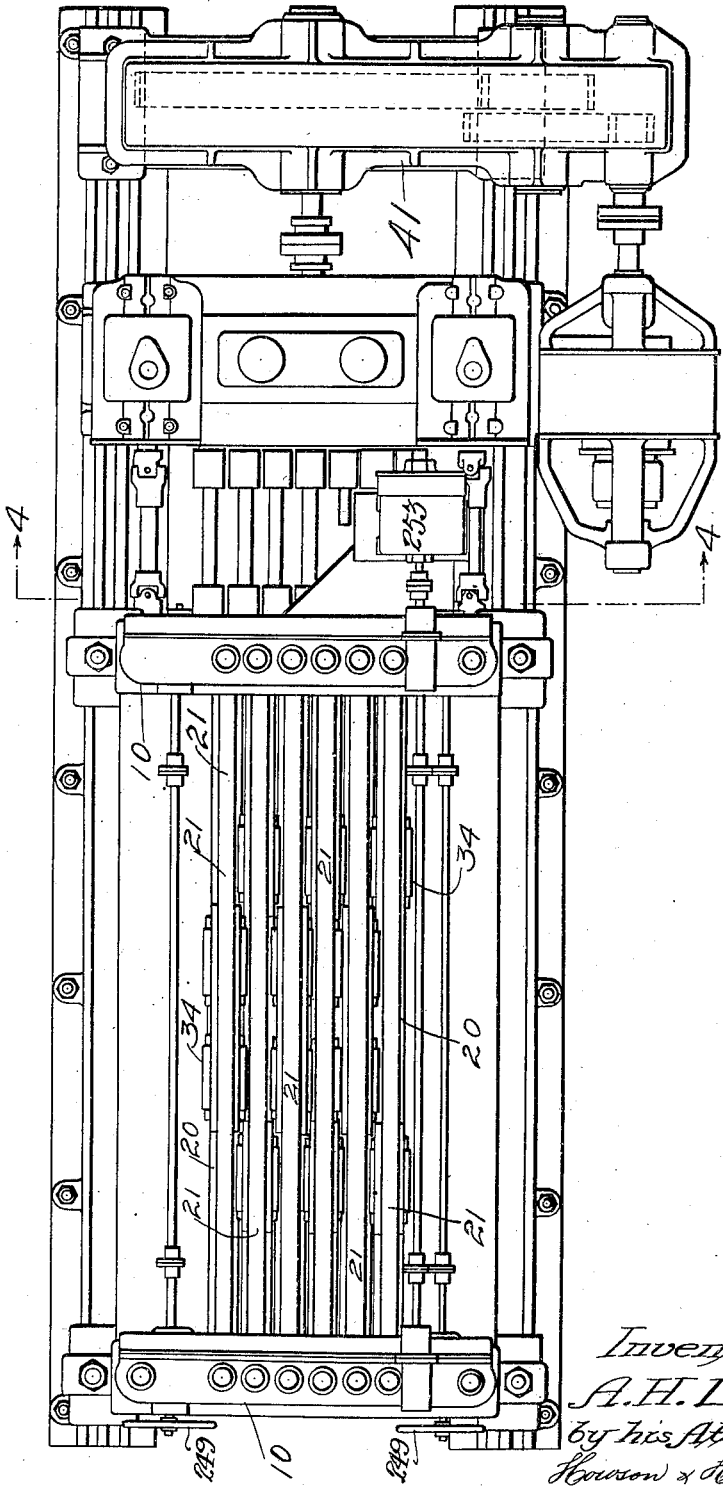
Fig. 2 is a plan view of Fig. 1.
Figure 3:
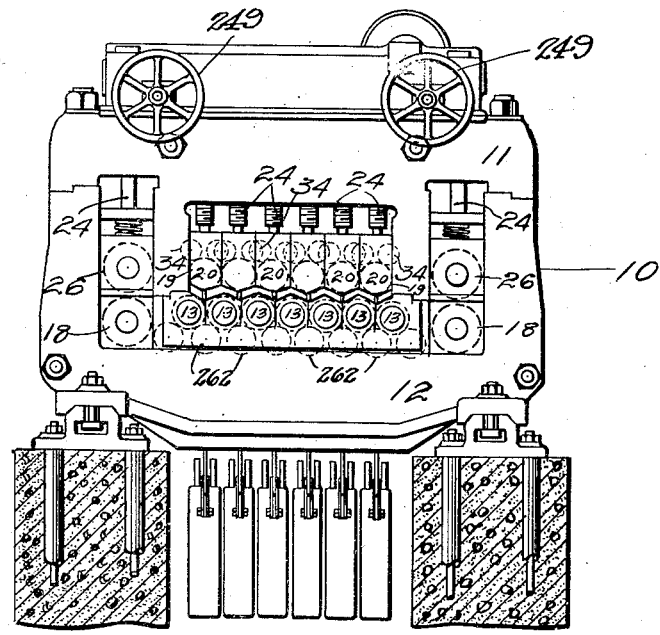
Fig. 3 is an end view.
Figure 4:
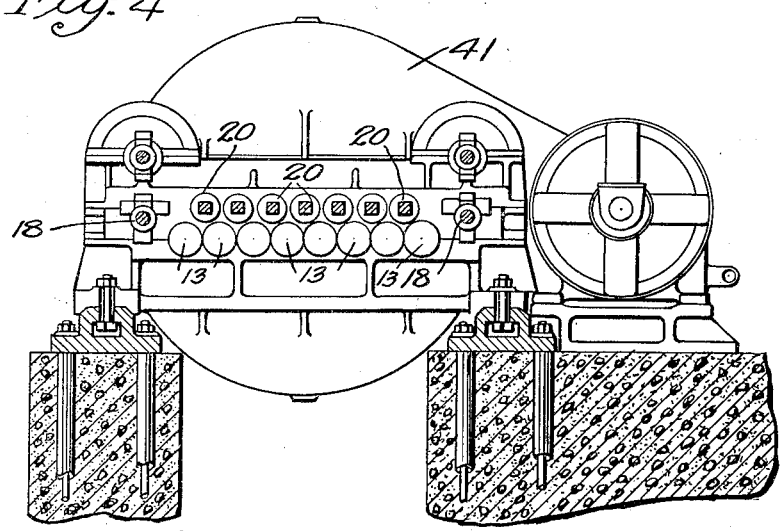
Fig. 4 is a sectional view taken on line 4—4, Fig. 2.

Referring now more particularly to the drawings, the numeral 10 generally designates end standards each formed in an upper and a lower section 11 and 12. The lower section provides mountings for the lower straightening rolls 13 each straightening roll 13 being preferably mounted in an individual end bearing 14 independently removable with its roll when the upper and lower sections 11 and 12 are separated. Bearings 14 are disposed in a notch 15 formed in the upper surface of the lower section and are arranged in side-to-side relation in this notch. The lower section 12 is also notched at 16 for the reception of the bearing elements 17 of the lower pinch rolls 18. The upper section 11 is notched above notch 15 to provide for the reception of the bearings 19 of the upper straightening rolls 20. The bearings 19 of the upper straightening rolls 20 are carried by the outer ends of bridge elements 21 which extend between adjacent faces of the standards 10 and have at their ends dove-tailed engagement therewith as at 22. These bearings are bolted to the ends of the bridge element as indicated at 23, and may be independently removed therefrom to permit endwise removal of a damaged upper straightening roll. Bearings 19 are in side-to-side relation and serve to mutually guide and support one another against transverse displacement.

Each bearing 19 is abutted by a vertically-extending adjusting worm 24 through which the extent of its possible separation from the associated lower straightening rolls 13, with relation to which the rolls 20 are staggered, may be controlled.

Each adjusting worm 24 is mounted in a nut 240 which is in turn rotatably mounted in the upper frame element 11 and held against vertical movement therein by any suitable means such as a set screw 241 engaging in a groove 242 formed in the periphery of the nut. Means are provided for rotating the nut 240 and for rotating the worm 24. In the case of the upper straightening rolls, the nut 240 has at its lower end an exposed portion socketed at 243 for the reception of a spanner wrench or a pin so that manual adjustment of the nut may be had. The upper end of the worm 24 has mounted thereon a worm gear 244 which is splined to the worm and is driven by a worm 245 on a drive shaft 246 which is common to all of the worms 24.

In the case of the pinch rolls, the worms 24 of the upper pinch rolls have the nuts thereof provided at their upper ends with worm gears 247 each operable by a worm 248 operated through a hand wheel 249. As in the case of the worm 24 of the straightening rolls, the worms 24 of the pinch rolls 18 and 26 have at their upper ends worm gears 244 meshing with worms 245 on shaft 246. Shaft 246 has thereon a worm gear 250 engaged by a worm 251 on a shaft 252, shaft 252 being driven by a motor 253 and being a drive common to the shafts 246 of the sections 11 at opposite ends of the machine. It will thus be seen that in the case of both upper pinch and straightening rolls means are provided for simultaneously adjusting these rolls or for independently adjusting the same.

It will be noted that the lower straightening rolls 13 are in staggered relation to the upper straightening rolls and as a means for maintaining the bearings of the upper straightening rolls in engagement with their respective worms, I form in the lower standard section 12 vertical guide openings extending between adjacent bearings of the lower straightening rolls and open at their lower ends as indicated at 254 in Fig. 6. The frame 12 at its inner face and in alignment with each opening has a depending link 255 pivotally connected therewith as at 256, the lower end of this link engaging a lever 257 intermediate its ends. At one end of this lever a counterweight 258 is disposed and the opposite end of the lever engages a pusher bar 259, the upper end of which engages the lower face of the bearing 19 of the associated straightening roll.

Above the notches 16 the base section 12 and upper section 11 combine to produce openings in which the bearings 25 of the upper or cushioned pinch rolls 26 are mounted. The sides of the base section and upper section at opposite sides of the line of demarcation therebetween are recessed as at 27 to house pivoted hold-down studs 28 which are loosened and swung to disengage the upper section 11 and permits these sections to be bodily removed.

Each bridge element 21 has associated therewith hold-down roll means generally designated at 29. Where the upper straightening rolls are fair size, the backing-up means is preferably constructed as illustrated in Figs. 1 to 10. In these figures the bridge has secured thereto brackets 30 each embodying spaced depending portions 31 combined to receive the ends of parallel shaft 32, the axes of which are parallel to the axes of the upper straightening rolls 13. These shafts are preferably keyed against rotation as at 33 and have rotatably mounted thereon rollers 34. In the present showing rollers 34 are supported from the shaft through roller bearings 35 and shaft 32 is bored to provide its lubrication supply channels 36 for such bearings. Brackets 30 of adjacent bridges are staggered with relation to one another. In the present instance the upper straightening rollers or shafts are shown as 6 in number, and the roller brackets of the first, third and fifth shafts are spaced from one another a distance such that the adjacent ends of the brackets will slightly overlap the adjacent ends of pairs of brackets 30 upon the second, fourth and sixth shafts. The bracket ends are preferably reduced slightly as indicated at 37, these adjacent ends overlapping and having sliding engagement with one another. Thus the brackets 30 which have engagement with one another and with the rolls at points well spaced at opposite sides of a vertical plane including the axis of the roll serve to solidly reinforce the roll both against vertical and transverse displacement. The backing rolls 34 by this construction may be caused to contact the leveling rolls at points much more widely spaced than is otherwise possible and at the same time there is no interference with independent movement of the straightening rolls.

In Figs. 11 and 12 brackets 38 which correspond to brackets 30 each support a single roller 39, rollers 39 being disposed at an angle to the axis of the straightening roll being longitudinally concave so that throughout their length they bear upon the surface of the straightening roll to reinforce the same. By this arrangement contact with the straightening roll at points well spaced at opposite sides of the vertical plane including the axis thereof, is obtained, backing-up rollers each occupying even less space than the structure previously described.

In the brackets 38 the depending portions 40 may be offset so that the bracket supporting the roll will partially overlie the next adjacent rolls at opposite sides of the associated straightening roll. It will be noted that in each instance the backing-up rollers associated with each upper straightening roll actually overlap the next adjacent roll without contacting therewith.

As a backing-up means for the lower straightening rolls I support from the longitudinal sills 260, which comprise the supports for the standards 10, transversely-extending bearing elements or supports 261, each of which supports one end of a plurality of longitudinally-extending rolls 262. Each roll 262 engages between two of the lower straightening rolls and serves to mutually support the same. The rolls 262 are one more in number than the lower straightening rolls 13 so that a backing-up roll 262 is disposed at each side of the center of each of the lower straightening rolls.

Figure 13:
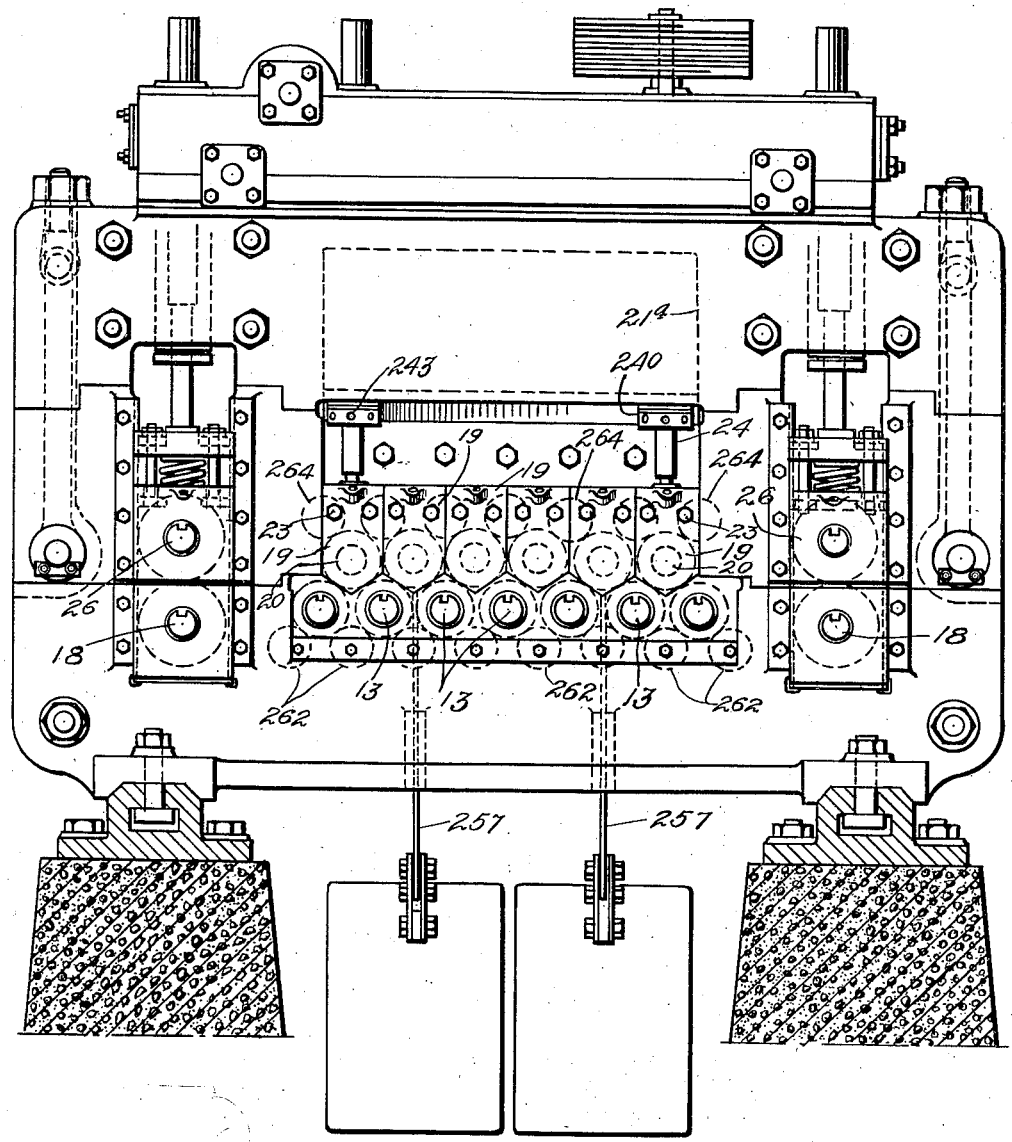
Fig. 13 is an end elevation of a slightly modified form of sheet straightening machine.

As more clearly shown in Figs. 13 and 14, a similar backing-up structure to that employed for the lower straightening rolls in Figs. 1 to 12 is provided for the upper straightening rolls where these straightening rolls must be made very small, as for example, in a straightening machine for use in straightening tin plate or other fine gauge metal. In these figures the structure employed is similar to that in Figs. 1 to 12 with the exception of the fact that instead of providing independent bridges for each of the upper straightening rolls, a single bridge element 21a common to all of the upper straightening rolls is provided. This bridge element 21a supports bracket elements 263 having backing-up rolls 264, the arrangement of which is similar to those provided in conjunction with the backing-up rolls of Figs. 1 to 12 for the lower straightening rolls. With the use of a unitary bridge, it is, of course, unnecessary that a worm 24 be provided for each straightening roll, there being two of these worms, one engaging the straightening roll at each end of the series. The control elements for the worms 24 are, however, identical with those previously described. Bearings 19 of the upper straightening rolls in a construction of this character may be constructed as a unit, but are preferably individually constructed and attached to the bridge as illustrated so that they may be independently removed to permit independent removal of a broken or damaged straightening roll.

I claim:

1. In a sheet-straightening machine, upper and lower straightening rolls, bearings for the ends of each upper straightening roll, said bearings being disposed in side-to-side relation and being independently slidable with respect to one another, a bridge connecting the end bearings of each upper straightening roll and backing-up roll means carried by said bridge.

2. In a sheet-straightening machine, upper and lower straightening rolls, bearings for the ends of each upper straightening roll, said bearings being disposed in side-to-side relation and being independently slidable with respect to one another, a bridge connecting the end bearings of each upper straightening roll and backing-up roll means carried by said bridge, said means including portions engaging the roll at opposite sides of a vertical plane including the axis.

3. In a sheet-straightening machine, upper and lower straightening rolls, bearings for the ends of each upper straightening roll, said bearings being disposed in side-to-side relation and being independently slidable with respect to one another, a bridge connecting the end bearings of each upper straightening roll and backing-up roll means carried by said bridge, the backing-up roll means of each roll being staggered with relation to said means of adjacent rolls.

4. In a sheet-straightening machine, upper and lower straightening rolls, bearings for the ends of each upper straightening roll, said bearings being disposed in side-to-side relation and being independently slidable with respect to one another, a bridge connecting the end bearings of each upper straightening roll and backing-up roll means carried by said bridge, the backing-up roll means of adjacent straightening rolls in staggered relation.

5. In a sheet-straightening machine, upper and lower straightening rolls, bearings for the ends of each upper straightening roll, said bearings being disposed in side-to-side relation and being independently slidable with respect to one another, a bridge connecting the end bearings of each upper straightening roll, a bracket carried by each bridge and backing-up roll means mounted on the bracket of each bridge and engaging the associated straightening roll at points spaced on opposite sides of a vertical plane including the axis of the straightening roll.

6. In a sheet-straightening machine, upper and lower straightening rolls, bearings for the ends of each upper straightening roll, said bearings being disposed in side-to-side relation and being independently slidable with respect to one another, a bridge connecting the end bearings of each upper straightening roll, a bracket carried by each bridge and backing-up roll means mounted on the bracket of each bridge and engaging the associated straightening roll at points spaced on opposite sides of a vertical plane including the axis of the straightening roll, the adjacent bridges being slidably engaged with one another.

7. In a sheet-straightening machine, upper and lower straightening rolls, bearings for the ends of each upper straightening roll, said bearings being disposed in side-to-side relation and being independently slidable with respect to one another, a bridge connecting the end bearings of each upper straightening roll, a bracket carried by each bridge and backing-up roll means mounted on the bracket of each bridge and engaging the associated straightening roll at points spaced on opposite sides of a vertical plane including the axis of the straightening roll, the brackets of adjacent bridges being staggered with relation to one another and having their adjacent ends overlapped and in sliding engagement with one another.

8. In a sheet-straightening machine, spaced end standards, each formed in upper and lower sections, means detachably maintaining such sections in assembled relation, adjacent faces of the sections being notched, a series of bearings in the notch of each section and straightening rolls having their ends engaged in said bearings, the notch of the upper section being of a depth permitting vertical sliding movement of the bearings therein.

9. In a sheet-straightening machine, spaced end standards, each formed in upper and lower sections, means detachably maintaining such sections in assembled relation, adjacent faces of the sections being notched, a series of bearings in the notch of each section and straightening rolls having their ends engaged in said bearings, the notch of the upper section being of a depth permitting vertical sliding movement of the bearings therein, said bearings being in side-to-side relation and in slidable engagement with one another.

10. In a sheet-straightening machine, spaced end standards, each formed in upper and lower sections, means detachably maintaining such sections in assembled relation, adjacent faces of the sections being notched, a series of bearings in the notch of each section and straightening rolls having their ends engaged in said bearings, the notch of the upper section being of a depth permitting vertical sliding movement of the bearings therein, said bearings being in side-to-side relation and in slidable engagement with one another and a bridge connecting the bearings at opposite ends of each upper straightening roll.

11. In a sheet-straightening machine, spaced end standards, each formed in upper and lower sections, means detachably maintaining such sections in assembled relation, adjacent faces of the sections being notched, a series of bearings in the notch of each section and straightening rolls having their ends engaged in said bearings, the notch of the upper section being of a depth permitting vertical sliding movement of the bearings therein, said bearings being in side-to-side relation and in slidable engagement with one another, a bridge connecting the bearings at opposite ends of each upper straightening roll and backing-up roll means carried by each bridge and engaging the roll associated therewith.

12. In a sheet-straightening machine, spaced end standards, each formed in upper and lower sections, means detachably maintaining such sections, in assembled relation, adjacent faces of the sections being notched, a series of bearings in the notch of each section and straightening rolls having their ends engaged in said bearings, the notch of the upper section being of a depth permitting vertical sliding movement of the bearings therein, said bearings being in a side-to-side relation and in slidable engagement with one another, a bridge connecting the bearings at opposite ends of each upper straightening roll and backing-up roll means carried by each bridge and engaging the roll associated therewith, the backing-up roll means of each bridge including a part slidably engaging the backing-up roll means of adjacent bridges.

13. In a sheet-straightening machine, two parallel series of rollers arranged in side-to-side relation, each series adapted to engage one face of a sheet to be straightened, one of said series being movable toward and away from the other series, backing-up roll means associated with the rolls of said series and maintaining said rolls against deflection tending to separation of the rolls from the rolls of the other series, or approach of the rolls of said series toward one another, and a rigid connection between the bearings at opposite ends of the rolls of said series fixedly mounting the backing-up roll means.

14. In a sheet-straightening machine, upper and lower series of straightening rolls, bearings for the ends of each upper straightening roll, a single bridge supporting the end bearings of all of said upper straightening rolls and movable toward and away from the lower straightening roll series and backing-up roll means carried by said bridge and fixed against movement with relation to said bridge.

15. A device as claimed in claim 1 wherein means are provided for independently, or simultaneously, adjusting the bearings of the upper straightening rolls to move said rolls toward or away from the lower straightening rolls.

16. In a sheet-straightening machine, upper and lower straightening rolls, bearings for the upper ends of each straightening roll, means constantly urging said bearings upwardly, means for adjusting the bearings downwardly to determine the space between the upper and lower straightening rolls comprising rotatable nuts held against vertical movement, worms mounted in said nuts and abutting the bearings, means for rotating said worms and independent means for rotating said nuts.

17. The combination with a bearing of a roll of sheet-straightening mechanism, a worm abutting the bearing, a nut receiving the worm, said nut being mounted for rotation and held against movement, means for rotating the worm and means for rotating the nut.

ARTHUR H. LONG.